March 26, 1963 C. M. D. REED 3,082,906
HANDLE CONSTRUCTION FOR UTENSILS
Filed Sept. 22, 1961
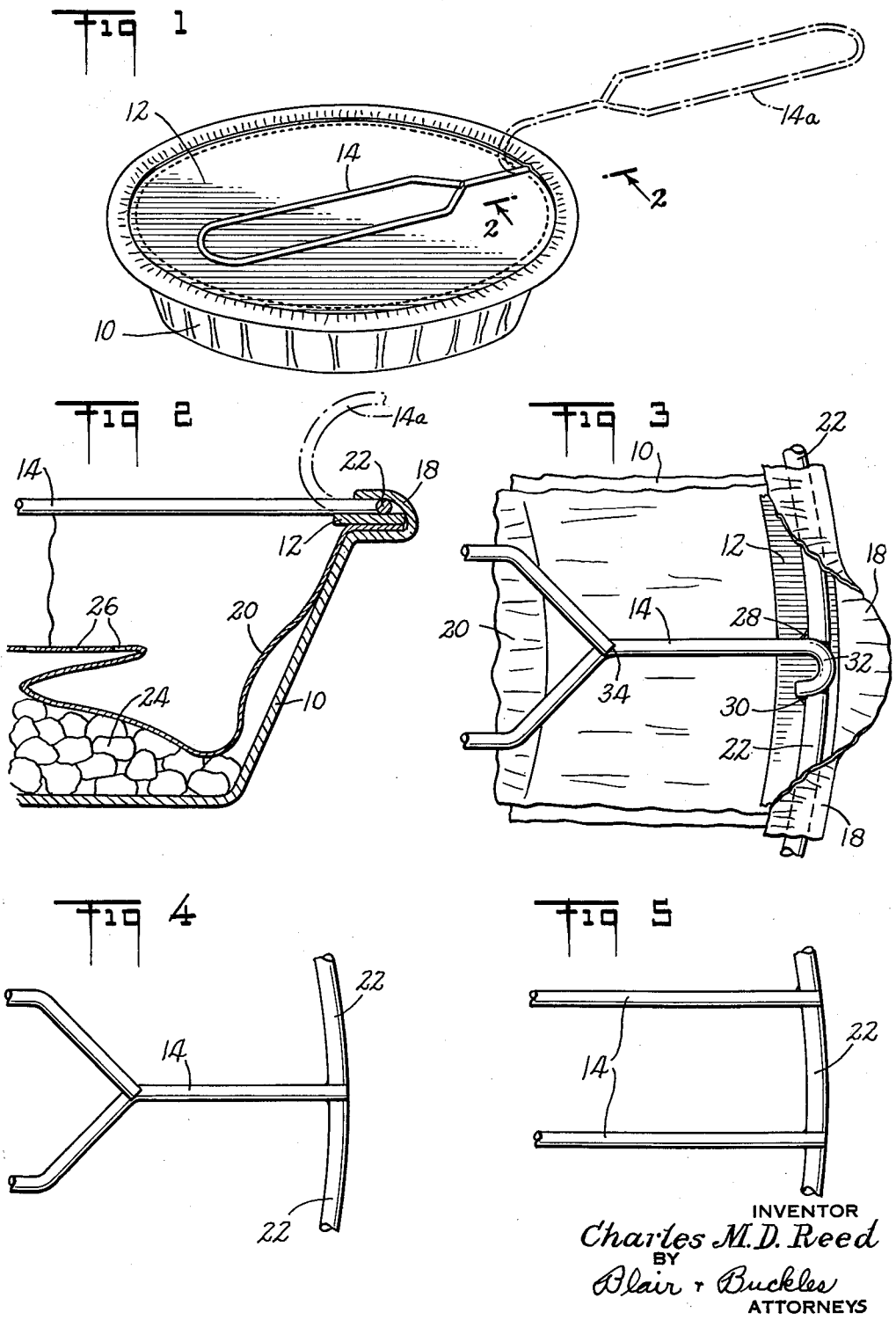
INVENTOR
Charles M.D. Reed
BY
Blair & Buckles
ATTORNEYS United States Patent Office 3,082,906
Patented Mar. 26, 1963

3,082,906
HANDLE CONSTRUCTION FOR UTENSILS
Charles M. D. Reed, Rowayton, Conn., assignor to The Taylor-Reed Corporation, Stamford, Conn.
Filed Sept. 22, 1961, Ser. No. 139,941
1 Claim. (Cl. 220—95)

The present invention relates to the art of disposable cooking utensils, and in particular to such cooking utensile with a bendable handle so as to provide for compactness in shipping and storage.

There are present on the market a variety of economical utensils of the "throw away" type, commonly made of a material ssuch as relatively thin aluminum foil. These utensils are sometimes utilized to hold the food while it is being heated and cooked and occasionally as the serving plate itself, after cooking. One of the principal problems in the prior art has been the provision of suitable handles for such disposable cooking utensils, which handles would be compact for storage, sturdy in use and economical. Several different solutions to this problem have been proposed, but none of the known solutions have met all the above criteria. It is highly desirable that the handle should be a part of the utensil itself, in order that it be available for use when desired, and yet it should not add to the storage and shipping problems by requiring unnecessary storage space.

Handles which are not integral with the pan tend to become relatively elaborate and expensive, compared to an integral type. Furthermore such separate handles always present the danger that the utensil may slip out of the handle during use, permitting the utensil and its contents to drop into the flame. In addition, there is always the problem of the added storage and shipping space required for the separate handles.

Typical integral handles of the prior art were either rigidly fixed to the pans and protruded at the angle in which they would be used (thereby requiring added storage and shipping space and being awkward in a shopping bag), or they were relatively unstable and lacked the sturdiness required for handling the pan in the operation of cooking.

It is accordingly an object of the invention to provide a convenient handle for a utensil.

It is a further object of the invention to provide an integral handle for a disposable cooking utensil.

It is a further object of the invention to provide a handle of the above character which is economical and simple to manufacture.

It is a further object of the invention to provide a handle of the above character which is compact for storage and shipping.

It is a further object of the invention to provide a handle of the above character which is simple to manipulate.

It is a further object of the invention to provide a handle of the above character which is safer and sturdier than the previous handles available in the prior art.

Other objects of the invention will in part be obvious and will appear in part hereinafter.

The invention accordingly comprises the features of construction, combinations of elements, and arrangements of parts which will be exemplified in the constructions hereinafter set forth, and the scope of the invention will be indicated in the claim.

For a fuller understanding of the nature and objects of the invention, reference should be had to the following detailed description taken in connection with the accompanying drawings, in which:

FIGURE 1 is a perspective view of the preferred embodiment of the invention, and shows in dotted lines the handle bent back in the position ready for use.

FIGURE 2 is a fragmentary sectional view taken along the line 2—2 of FIGURE 1.

FIGURE 3 is a fragmentary top plan view of the embodiment of FIGURE 1 with the outer foil pulled back to show the method of attachment of the handle to the ring.

FIGURES 4 and 5 are similar fragmentary top plan views of alternative embodiments of the invention.

Similar reference characters refer to similar parts throughout the several views of the drawings.

As is shown particularly in FIGURE 1, the invention comprises the provision of an integral, bendable handle 14 attached at one end to a rigid structural member at the periphery of the utensil. The handle 14 is normally disposed approximately in the plane of the periphery of the utensil for compactness, and is bent upwardly and outwardly to the position shown in dot-dashed lines at 14a in FIGURE 1 to provide a convenient means for manipulating the utensil during use.

Referring now to the figures in detail, there is shown in FIGURE 1, by way of example, a pop corn pan of the disposable type having a pan portion 10, a cardboard cover 12, and a handle 14, the handle 14 being shown in its flat or storage position wherein it is disposed generally within the plane of the rim of the pan. In the dotted lines the handle 14 is shown in its second position after it has been bent back ready for use. The pan is preferably of relatively heavy gauge aluminum foil, for example of approximately .0035 to .005 inch in thickness, although the thickness of the foil is not at all critical. It is only necessary that the foil be heavy enough to withstand the heat and mechanical stresses to which it is subjected. The foil is preferably stamped or otherwise formed to provide a pan shaped container. The cardboard cover preferably has a perforated line around it near the rim of the pan to provide a tear-out central portion.

As may be seen in FIGURE 2 the outer foil which constitutes the pan proper is crimped at 18 around an expansible inner foil 20, the cardboard cover 12 (here shown with the tear-out center removed), and a rigid arcuate structural member 22, preferably in the form of a complete ring. There is disposed within the pan 10 a body of food-stuff 24 which is to be prepared (here illustrated as popcorn). The foil 20 preferably has perforations as at 26 in order to permit escape of the gases generated during the cooking process. The expansible foil 20, as is well known in the art, is large enough to provide a greatly increased volume between the foil 20 and the pan 10 upon expansion of the popcorn 24, in order to accommodate the greatly increased volume of the popped popcorn. Accordingly in the device before cooking the foil 20 is disposed between the cardboard tear-out center and the pan 10, and may be arranged in loose folds as generally indicated in FIGURE 2. Preferably the foil 20 is also of aluminum foil, of a thinner gauge than that which makes up the pan proper 10, so that when the popcorn expands the pan 10 remains stable in dimensions while the increase in enclosed volume is due primarily to the change in position of the expansible foil 20.

As may be seen in FIGURE 3, wherein a portion of the crimped-over edge 18 of the foil 10 has been pulled back in order to show the construction, the handle 14 is attached to the ring 22 by means of a pair of welds indicated at 28 and 30, the handle wire being formed at that portion into a bight 32 with the ends of the ring 22 being welded to the bight portion. In the preferred embodiment this is done with electrical arc welding. As illustrated in FIGURE 3, the handle 14 is preferably of a more easily deformed material than structural member 22 in order to minimize distortion of member 22 when the handle 14 is bent. This may be provided, for example as shown, by utilizing a thinner gauge wire for handle 14 than for ring 22. In a successful embodiment, the ring 22 was constructed of 14 gauge wire while the handle 14 was constructed of 15 gauge wire. However, the same result could be accomplished by using similar thickness wires, wherein the wire of which the handle 14 is formed is of an inherently softer metal than the wire of which the ring 22 is formed.

As is also shown in FIGURE 1, the portion of the handle 14 which would be held in the hand is formed by bending the wire back on itself to form a loop and electrically spot welding as shown at 34 in FIGURE 3, to provide a sufficient broad grip to permit easy handling during the cooking operation.

The particular manner of attaching the handle 14 to the ring 22 is not essential to the invention. As may be seen in FIGURE 4, the handle 14 may be inserted between the two ends of the generally annular formed wire 22, and the entire assembly butt-welded. Alternatively the wire 14 may be welded to the completed structural member or ring 22 at any point on the circumference of element 22, not necessarily at the point where the two joined ends of the wire 22 are welded to form the ring. Furthermore, if wire 22 is of a relatively heavy gauge, it need not be formed into a complete annulus, but might extend for approximately 180 degrees, in which case wire 14 would preferably be welded or attached at a point midway between the ends of wire 22.

A further alternative embodiment is shown in FIGURE 5, wherein the wire 14 has each of its ends welded to ring 22, with the handle portion itself disposed in the plane of ring 22. Of course, here also the wire which forms the handle 14 is easier to bend than the ring 22, so that the handle 14 may be bent back to its operating position without distorting ring 22.

While the construction shown in FIGURE 1 has the handle 14 and ring 22 disposed on top of cover 12, it may be preferable to place the cover 12 on top, with the handle 14 thus being concealed until the cover 12 is removed. This would eliminate the possibility of inadvertently catching the handle 14 on another object during shipping and handling, and would provide an attractive package for display. Furthermore, while the utensil has been illustrated as round or circular, the utensil 10 may be of other configurations, such as square or rectangular, in which case the structural member 22 would not necessarily be arcuate.

Although as shown in the drawings the bendable handle and rigid structural member sub-assembly is preferably integral with the utensil, this sub-assembly could be manufactured and sold for use as a separate handle. In this case the utensil could be inserted into the arcuate structural member 22 so that the flange of the utensil rested on the member 22 after the handle portion 14 were bent back. The sub-assembly itself is very compact for storage and shipping.

It is apparent from the above description that sturdy, compact separate handles and utensils with integral sturdy handles have been provided which are economical and simple to manufacture. The several handles as disclosed are compact, being disposed generally in the plane of the rim of the utensil until ready for use, whereupon the handle may be readily bent back into the usual handle position.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention, which, as a matter of language, might be said to fall therebetween.

I claim:

A pan and handle assembly comprising, in combination, a closed wire metal planar ring engaging with the periphery of the pan, said pan having its upper edge crimped about said ring and supported thereby, and a wire metal handle rigidly connected to said ring, said handle having a first position extending inwardly of said ring and overlying said pan and substantially in the plane of said ring, said ring having a torsional resistance greater than the resistance to bending of said metal handle in the area adjacent the connection of said metal handle and said ring, whereby said handle may be bent to a second position extending outwardly from said ring.

References Cited in the file of this patent

UNITED STATES PATENTS

| | | |
|---|---|---|
| 403,656 | Gerstle | May 21, 1889 |
| 1,462,880 | Altman | July 24, 1923 |
| 2,673,806 | Colman | Mar. 30, 1954 |
| 2,791,350 | Mennen | May 7, 1957 |
| 2,965,281 | Herrmann | Dec. 20, 1960 |